US011752687B2

(12) United States Patent
Kim et al.

(10) Patent No.: US 11,752,687 B2
(45) Date of Patent: Sep. 12, 2023

(54) METHOD FOR 3D PRINTING AND 3D PRINTER USING ULTRASOUND

(71) Applicant: KOREA INSTITUTE OF SCIENCE AND TECHNOLOGY, Seoul (KR)

(72) Inventors: Hyung Min Kim, Seoul (KR); Ki Joo Pahk, Seoul (KR); Byung Chul Lee, Seoul (KR); Inchan Youn, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 873 days.

(21) Appl. No.: 16/548,412

(22) Filed: Aug. 22, 2019

(65) Prior Publication Data

US 2020/0061904 A1 Feb. 27, 2020

(30) Foreign Application Priority Data

Aug. 23, 2018 (KR) .................. 10-2018-0098334

(51) Int. Cl.
 *B29C 64/106* (2017.01)
 *B29C 64/393* (2017.01)
 (Continued)

(52) U.S. Cl.
 CPC .......... *B29C 64/106* (2017.08); *B29C 64/393* (2017.08); *B33Y 10/00* (2014.12);
 (Continued)

(58) Field of Classification Search
 CPC ... B29C 64/106; B29C 64/393; B29C 64/291; B29C 64/295; B29C 64/20;
 (Continued)

(56) References Cited

U.S. PATENT DOCUMENTS

2016/0031156 A1 2/2016 Harkness et al.
2016/0228991 A1 8/2016 Ryan et al.
(Continued)

FOREIGN PATENT DOCUMENTS

JP 2003-509244 A 3/2003
JP 2017-144700 A 8/2017
(Continued)

OTHER PUBLICATIONS

Kim, HyoGab, 3D Printer of Roll Type, KR1020170081849, Nov. 11, 2017, English translation and original document.*

*Primary Examiner* — Philip C Tucker
*Assistant Examiner* — Brian R Slawski
(74) *Attorney, Agent, or Firm* — Birch, Stewart, Kolasch & Birch, LLP (57) ABSTRACT

According to an embodiment of the present disclosure, there is provided a completely new type of 3-dimensional (3D) printing method for producing an object by focusing ultrasound onto material that changes in state by stimulation to solidify it into a desired shape. The method for 3D printing according to an embodiment includes providing material which changes in state by stimulation, setting a target focal point in the material, focusing ultrasound onto the target focal point using at least one ultrasound transducer, and applying stimulation to the material using the focused ultrasound to induce a change in state of the material. According to the embodiments, it is possible to control the precision of the output by controlling the frequency of the ultrasound transducer or the size of the target focal point on system.

18 Claims, 6 Drawing Sheets

(51) Int. Cl.
  *B33Y 50/02* (2015.01)
  *B33Y 30/00* (2015.01)
  *B33Y 10/00* (2015.01)
  *B29C 64/291* (2017.01)
  *B29C 64/282* (2017.01)

(52) U.S. Cl.
  CPC ............... *B33Y 30/00* (2014.12); *B33Y 50/02* (2014.12); *B29C 64/282* (2017.08); *B29C 64/291* (2017.08)

(58) Field of Classification Search
  CPC ... B29C 64/264; B29C 64/277; B29C 64/282; B33Y 10/00; B33Y 30/00; B33Y 50/02; B33Y 40/20; B33Y 70/00
  USPC .............. 264/308, 401, 407; 425/375, 174.2, 425/174.4
  See application file for complete search history.

(56) References Cited

U.S. PATENT DOCUMENTS

| | | | |
|---|---|---|---|
| 2016/0250711 A1* | 9/2016 | Moagar-Poladian | B22F 3/10 228/110.1 |
| 2016/0271870 A1* | 9/2016 | Brown, Jr. | C04B 35/64 |
| 2017/0125892 A1* | 5/2017 | Arbabian | A61B 5/0028 |
| 2017/0297253 A1 | 10/2017 | Tyler | |
| 2018/0029293 A1* | 2/2018 | Neibecker | C04B 35/628 |
| 2018/0257307 A1* | 9/2018 | Fenley | B29C 64/393 |
| 2018/0361680 A1* | 12/2018 | Bharti | B33Y 50/02 |
| 2020/0001533 A1* | 1/2020 | Packirisamy | B28B 1/001 |

FOREIGN PATENT DOCUMENTS

| | | |
|---|---|---|
| KR | 10-1800674 B1 | 11/2017 |
| KR | 10-2018-0030379 A | 3/2018 |
| KR | 10-2018-0037178 A | 4/2018 |
| KR | 10-2018-0067972 A | 6/2018 |
| WO | WO 01/20534 A1 | 3/2001 |
| WO | WO 2016/202954 A1 | 12/2016 |

* cited by examiner

METHOD FOR 3D PRINTING AND 3D PRINTER USING ULTRASOUND

CROSS-REFERENCE TO RELATED APPLICATION

This application claims priority to Korean Patent Application No. 10-2018-0098334, filed on Aug. 23, 2018, and all the benefits accruing therefrom under 35 U.S.C. § 119, the contents of which in its entirety are herein incorporated by reference.

BACKGROUND

1. Field

The present disclosure relates to a method for 3-dimensional (3D) printing and a 3D printer using ultrasound, and more particularly, to a method for performing 3D printing by applying stimulation to material that changes in state by stimulation using focused ultrasound to induce a change in state of the material and a 3D printer for implementing the same.

[Description of Government-Sponsored Research]

This study was supported by the Research-based Hospital Support Program (Development of non-invasive ultrasound based neural control and muscle rehabilitation systems, Project serial number: 1465026068) of Ministry of Health and Welfare under the supervision of Korean Institute of Science and Technology.

2. Description of the Related Art

A 3-dimensional (3D) printer refers to a device that can produce a 3D object based on 3D modeling. A general printer outputs characters and figures on the plane by outputting an ink based on x- and y-axis plane information, while a 3D printer can produce a 3D object by cutting or depositing material, for example, plastic, metal and paper, based on x-, y- and z-axis 3D information of the object.

The output type of a 3D printer is largely classified into two: a cutting method that produces an object by sculpting a large mass of raw material with a cutter or a laser, and a deposition method that produces an object by depositing a powder or liquid medium on the field layer by layer.

A cutting 3D printer is a sort of Computer Numerical Control (CNC) equipment using 4- or 5-axis machine, and produces an object by machining a mass of integrated raw material, and thus, it is widely used in the industrial field due to high durability, but it requires a high cost and a long time to produce.

A deposition 3D printer deposits a medium upwards layer by layer using a nozzle, and can materialize a more delicate structure in an object and is lower in price than a cutting printer, and thus it is commercialized for domestic uses in recent years. The widely used deposition printer uses Fused Deposition Modeling (FDM) technique that melts a plastic material and jets it from a nozzle, polyjet technique that jets a light-curing liquid resin from a nozzle and cures it using light energy, and Selective Laser Sintering (SLS) technique that places a powder material on the field, and repeatedly melts and hardens selected parts using a laser.

Recently, with support by relevant technology, 3D printers can use more than 300 types of materials as an ink material, and have a wide range of applications in the field of production of daily goods or industrial components, construction, medical, military and aerospace.

However, despite the development of technology, the long production time problem of 3D printers still remains challenging, and not only a cutting method that produces an object by sculpting a mass of raw material but also a deposition method that deposits a medium upwards using a nozzle has a slower process speed than mass production using a template in the factory.

In this context, studies have been made on methods for increasing the output speed of 3D printers. For example, according to Korean Patent Publication No. 10-2018-0067972, multiple output parts are provided to simultaneously produce a plurality of shapes in one deposition 3D printer in order to improve the object production speed. However, a 3D printing method that deposits materials using a nozzle cannot be a fundamental solution.

SUMMARY

The present disclosure is directed to providing a completely new type of 3-dimensional (3D) printer. More particularly, the present disclosure is directed to providing a new type of 3D printer for producing an object by focusing ultrasound onto material that changes in state by stimulation (for example, a fluid that is solidified by high temperature, vibration or the presence of acoustic cavitation) to solidify it into a desired shape and a method for 3D printing using the same.

A method for 3D printing using ultrasound according to an embodiment of the present disclosure includes providing material which changes in state by stimulation, setting a target focal point in the material, focusing ultrasound onto the target focal point using at least one ultrasound transducer, and applying stimulation to the material using the focused ultrasound to induce a change in state of the material.

In an embodiment, the setting the target focal point in the material may include receiving 3D modeling information of an object to create, determining a set of target focal points based on the 3D modeling information of the object, and determining at least one ultrasound transducer for focusing the ultrasound onto each of the set of target focal points.

In an embodiment, the method may further include controlling a frequency outputted by the at least one ultrasound transducer or a size of the target focal point to control precision of 3D printing.

In an embodiment, the material may be a fluid which is solidified by the stimulation of a threshold (temperature and/or pressure) or above, and the ultrasound transducer may be configured to focus the ultrasound onto the target focal point in the fluid to induce the stimulation of the threshold or above.

In an embodiment, the stimulation may include a temperature change or a mechanical vibration.

In an embodiment, the material may be a solid which is removable by the stimulation of a threshold or above, and the ultrasound transducer may be configured to focus the ultrasound onto the target focal point in the solid to induce the stimulation of the threshold or above in order to remove a part of the solid.

A computer program according to an embodiment of the present disclosure is stored in a computer-readable recording medium, and is configured to enable a processor to receive 3D modeling information of an object to create, determine a set of target focal points based on the 3D modeling information of the object, determine at least one ultrasound transducer for focusing ultrasound onto each of the set of target focal points, and control the ultrasound transducer to enable the at least one ultrasound transducer to focus the ultrasound onto the determined set of target focal points.

A 3D printer using ultrasound according to an embodiment of the present disclosure includes a housing to receive material which changes in state by stimulation, an ultrasound transducer to output ultrasound and focus the ultrasound onto a target focal point, a processor; and a controller to control the ultrasound transducer, wherein the ultrasound transducer is configured to apply stimulation to the material using the ultrasound to induce a change in state of the material.

In an embodiment, the ultrasound transducer may include a plurality of single integrated ultrasound devices, each ultrasound device may adjust the target focal point onto which the ultrasound is focused, by making a mechanical movement or receiving an electrical input, and the controller may perform 3D printing by mechanically moving or electrically controlling each ultrasound device.

In an embodiment, the ultrasound transducer may include a plurality of 1-dimensional array units, each array unit may include a plurality of single integrated ultrasound devices arranged in a series, and the controller may perform 3D printing by mechanically moving each array unit.

In an embodiment, the ultrasound transducer may include a plurality of 2-dimensional array units, each array unit may include a plurality of single integrated ultrasound devices arranged in rows and columns, and the controller may perform 3D printing by electrically controlling each array unit.

In an embodiment, in a large movement, the controller may adjust the target focal point by mechanically moving the ultrasound transducer, and in a small movement, the controller may adjust the target focal point by electrically controlling the ultrasound transducer.

In an embodiment, the single integrated ultrasound device may include an ultrasonic transducer using a piezoelectric material, CMUT, PMUT, an ultrasonic transducer using a photoacoustic effect, or an ultrasonic transducer using an electromagnetic force.

In an embodiment, the processor may receive 3D modeling information of an object to create, determine a set of target focal points based on the 3D modeling information of the object, determine at least one ultrasound transducer for focusing ultrasound onto each of the set of target focal points, and the controller control the determined ultrasound transducer to focus the ultrasound onto the set of target focal points.

In an embodiment, the controller may be configured to control a frequency of the ultrasound outputted by the at least one ultrasound transducer or a size of the target focal point.

In an embodiment, the material may be a fluid which is solidified by the stimulation of a threshold (temperature and/or pressure) or above, and the ultrasound transducer may be configured to focus the ultrasound onto the target focal point in the fluid to induce the stimulation of the threshold or above.

In an embodiment, the stimulation may include a temperature change or a mechanical vibration.

In an embodiment, the material may be a solid which is removable by the stimulation of a threshold (temperature and/or pressure) or above, and the ultrasound transducer may be configured to focus the ultrasound onto the target focal point in the solid to induce the stimulation of the threshold or above in order to remove a part of the solid.

According to the embodiments provided in the present disclosure, there is provided a completely new type of 3D printer for producing an object by focusing ultrasound onto material that changes in state by stimulation to solidify it into a desired shape.

According to an embodiment of the present disclosure, it is possible to simultaneously focus ultrasound onto a plurality of target focal points using a plurality of ultrasound transducers, thereby producing an object at a higher speed than a deposition 3D printer that deposits material upwards using a nozzle.

In addition, because a deposition 3D printer can only control the precision by controlling the thickness of the nozzle that jets a medium, once the output starts, it is inconvenient to replace the nozzle, which makes it difficult to control the precision, but according to an embodiment of the present disclosure, it is possible to control the precision of the output by controlling the frequency of the ultrasound transducer or the size of the target focal point on system.

DETAILED DESCRIPTION

Hereinafter, embodiments will be described in detail with reference to the accompanying drawings and the context described in the accompanying drawings, but the intended scope of claims is not defined or limited by the embodiments.

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be interpreted based on the substantial meaning of the terms and the context throughout the specification, rather than simply the name of the terms.

Additionally, the embodiment described herein may have aspects of entirely hardware, partly hardware and partly software, or entirely software. The term "unit", "device", "server" or "system" used herein refers to computer related entity such as hardware, hardware and software in combination, or software. For example, the unit, device, server or system may refer to hardware that makes up a platform in part or in whole and/or software such as an application for operating the hardware.

Hereinafter, the exemplary embodiments of the present disclosure will be described in more detail with reference to the accompanying drawings.

Components of the 3D Printer Using Ultrasound

Figure 1:
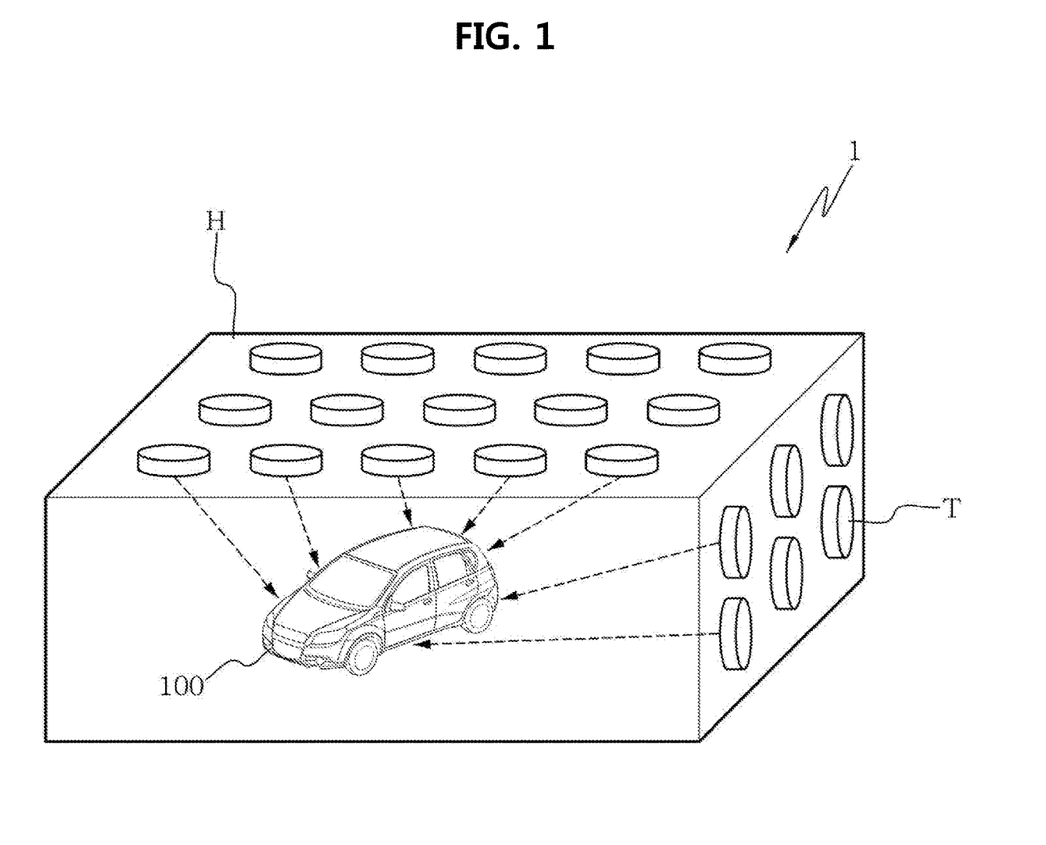
FIG. 1 is a diagram showing a 3-dimensional (3D) printer using ultrasound according to an embodiment.
Figure 2:
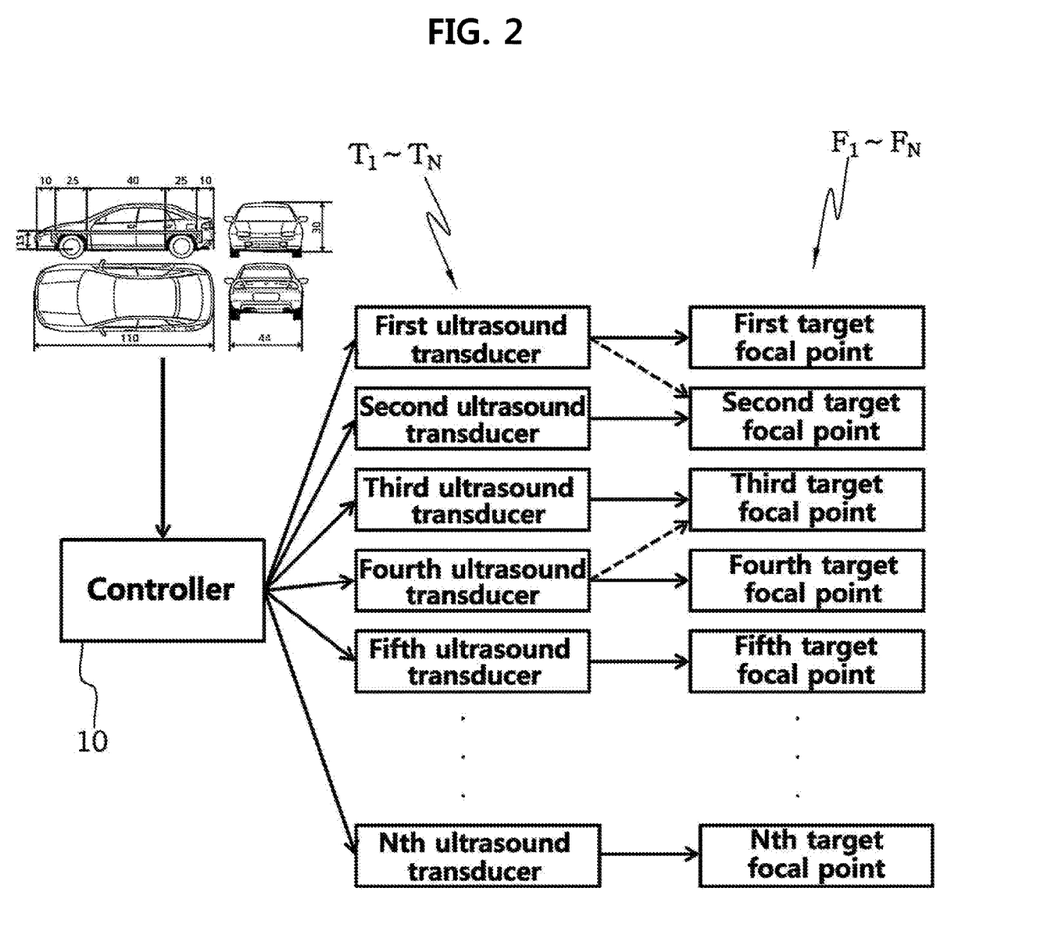
FIG. 2 is a block diagram showing a control system of a 3D printer using ultrasound.

FIG. 1 is a diagram showing a 3D printer using ultrasound according to an embodiment, and FIG. 2 is a block diagram showing a control system of the 3D printer using ultrasound.

Referring to FIG. 1, describing the structure of the 3D printer 1 using ultrasound, the 3D printer 1 using ultrasound may include a housing H for providing material and a plurality of ultrasound transducers T attached to the housing. However, this only describes necessary components for implementing the essential technical feature of the present disclosure, and a description of components included in a general 3D printer such as a body, a control circuit and a battery that constitute the printer is omitted herein.

Referring to FIG. 2, a controller 10 is connected to each ultrasound transducer $T_1$ to $T_N$ wiredly or wirelessly to control the setting values of target focal point, focused intensity and ultrasound frequency of the ultrasound transducers.

The housing H is a box-shaped component for storing and providing material used as a medium of 3D printing. Although FIG. 1 shows the rectangular housing H, the housing is not limited to a particular shape and may be formed in any shape that can receive the material. The housing is not limited to a particular material, and may be made of various materials, for example, plastic such as acryl and glass. When the ultrasound transducer T is installed outside, not inside, the housing H, the ultrasound transducer T may be made of acoustically transparent material which ultrasound can propagate.

The ultrasound transducer T refers to a sound source for focusing ultrasound onto a target focal point desired by a user with a desired intensity. The transducer converts alternating current energy of 20 KHz or above to mechanical vibration of the same frequency using the piezoelectric effect or the magnetostrictive effect. For example, the transducer may include a body that is open to one side and piezoelectric devices, the body may be filled with air, and each piezoelectric device may be connected to a wire to apply voltage. The piezoelectric device uses a material that causes the piezoelectric effect such as Quartz and Turmaline, and the transducer may generate and output ultrasound using the piezoelectric effect of the piezoelectric device. The structure of the transducer is provided for illustration purposes only, and the transducer is not limited to a particular structure or effect. The piezoelectric device of the transducer may output a suitable intensity of ultrasound by adjusting the output according to the purpose, and the outputted ultrasound overlaps to form an ultrasound beam.

The ultrasound transducer T should be understood as a concept encompassing a single transducer device having a single focal point as well as an array unit including a plurality of ultrasound devices arranged in 1-dimensional (for example, in a series) or 2-dimensional (for example, in rows and columns). Each ultrasound device may include all types of ultrasound devices including ultrasonic transducers using the piezoelectric materials, micromachined ultrasonic transducers such as CMUT and PMUT, ultrasonic transducers using the photoacoustic effect and ultrasonic transducers using electromagnetic forces.

Although FIG. 1 shows the 3D printer having the plurality of ultrasound transducers T attached to each side of the rectangular housing H, the technical spirit of the present disclosure is not limited to a particular connection structure. For example, the ultrasound transducers T may be connected to the body of the 3D printer without directly attaching to the housing H, or the ultrasound transducers T may independently form an array in the housing. The ultrasound transducers T are not limited to a particular number or shape and may have a suitable number or shape according to the purpose of use. For example, the 3D printer for making a small and simple object may have only a minimum number of ultrasound transducers.

The controller 10 is a combination of hardware and/or software for controlling the ultrasound transducer T, and serves to focus ultrasound onto the target focal point desired by the user by independently controlling each single integrated ultrasound device $T_1$ to $T_N$ that constitutes the ultrasound transducer or controlling the ultrasound array unit. Further, the controller 10 may control the printing precision by adjusting the frequency of ultrasound outputted from the ultrasound transducer or the size of the target focal point. In an embodiment, the controller 10 receives a control signal from the processor (not shown) through circuits or wireless network.

Each ultrasound device may adjust the target focal point F onto which ultrasound is focused, by making a mechanical movement or receiving an electrical input, and the controller 10 may perform 3D printing by mechanically moving or electrically controlling each ultrasound device $T_1$ to $T_N$.

In an embodiment, the plurality of ultrasound devices $T_1$ to $T_N$ may be arranged in 1-dimensional (horizontal or vertical direction) or 2-dimensional (horizontal and vertical directions) to form a 1-dimensional array unit or a 2-dimensional array unit, and the controller may perform 3D printing by mechanically moving or electrically controlling each array unit.

In an embodiment, in a large movement, the controller may adjust the target focal point by mechanically moving the ultrasound transducer (the single device or the array), and in a small movement, the controller may adjust the target focal point by electrically controlling the ultrasound transducer (the single device or the array). In another embodiment, 3D printing may be performed by mechanically moving the 1-dimensional array unit, and 3D printing may be performed by electrically controlling the 2-dimensional array unit.

The array of ultrasound transducers or the method for mechanically/electrically controlling the same as described above is provided for illustration purposes only and is not limited thereto. For example, not only an ordered array may be included, but also a sparse array in which the ultrasound devices are sparsely arranged or an array in which the ultrasound devices are arranged in an alternating manner such as a checkerboard.

In an embodiment of the present disclosure, the controller 10 may include a processor of the 3D printer, as well as a processor of an external device (for example, a laptop computer, a desktop computer, a tablet computer and a smartphone) that receives an input of command and transmits it to the 3D printer and an external server connected to each processor via a network. That is, the controller 10 may include all of necessary hardware/software participating in the process of controlling the ultrasound transducer according to the input (an automatic input based on 3D modeling information of the object or the user's manual input).

Hereinafter, a method for 3D printing implemented through the above-described components will be described in detail.

Method for 3D Printing Using Ultrasound

According to the present disclosure, it is possible to provide a new type of 3D printing technology for producing an object by focusing ultrasound onto material that changes in state by stimulation to solidify it into a desired shape.

First, material that changes in state by stimulation is provided as a medium that forms an object to create (print). This material is received in the housing H. In an embodiment, the material is a fluid that is prone to be solidified by stimulation (a temperature rise or a mechanical vibration) of the threshold (temperature and/or pressure) or above, and may include, for example, temperature-responsive or thermoresponsive polymers such as poly(N-isopropylacrylamide), poly(N,N-diethylacrylamide), poly(methyl vinyl ether) and poly(N-vinylcaprolactam) or compounds or polymers used in sonocrystallization such as poly-3-hexylthiophene.

Subsequently, the processor (and/or controller) sets a target focal point F in the material. The target focal point F is a spot onto which ultrasound generated by each ultrasound transducer T is focused, and a temperature rise or a strong vibration may take place around the corresponding spot. The target focal point F may be automatically set based on 3D modeling information of the object to create, and may be arbitrarily set by the user. As described above, the controller may include the processor for setting the target focal point according to the input and controlling the ultrasound transducer.

Subsequently, the material is solidified by focusing ultrasound onto the set target focal point F using the ultrasound transducer T. Finally, the remaining material except the solidified part is removed to complete the object 100.

As described above, ultrasound may be simultaneously focused onto the plurality of target focal points using the plurality of ultrasound devices installed on each side of the housing. Accordingly, it is possible to produce the object at a higher speed than a deposition 3D printer that deposits material upwards using a nozzle.

Figure 3:
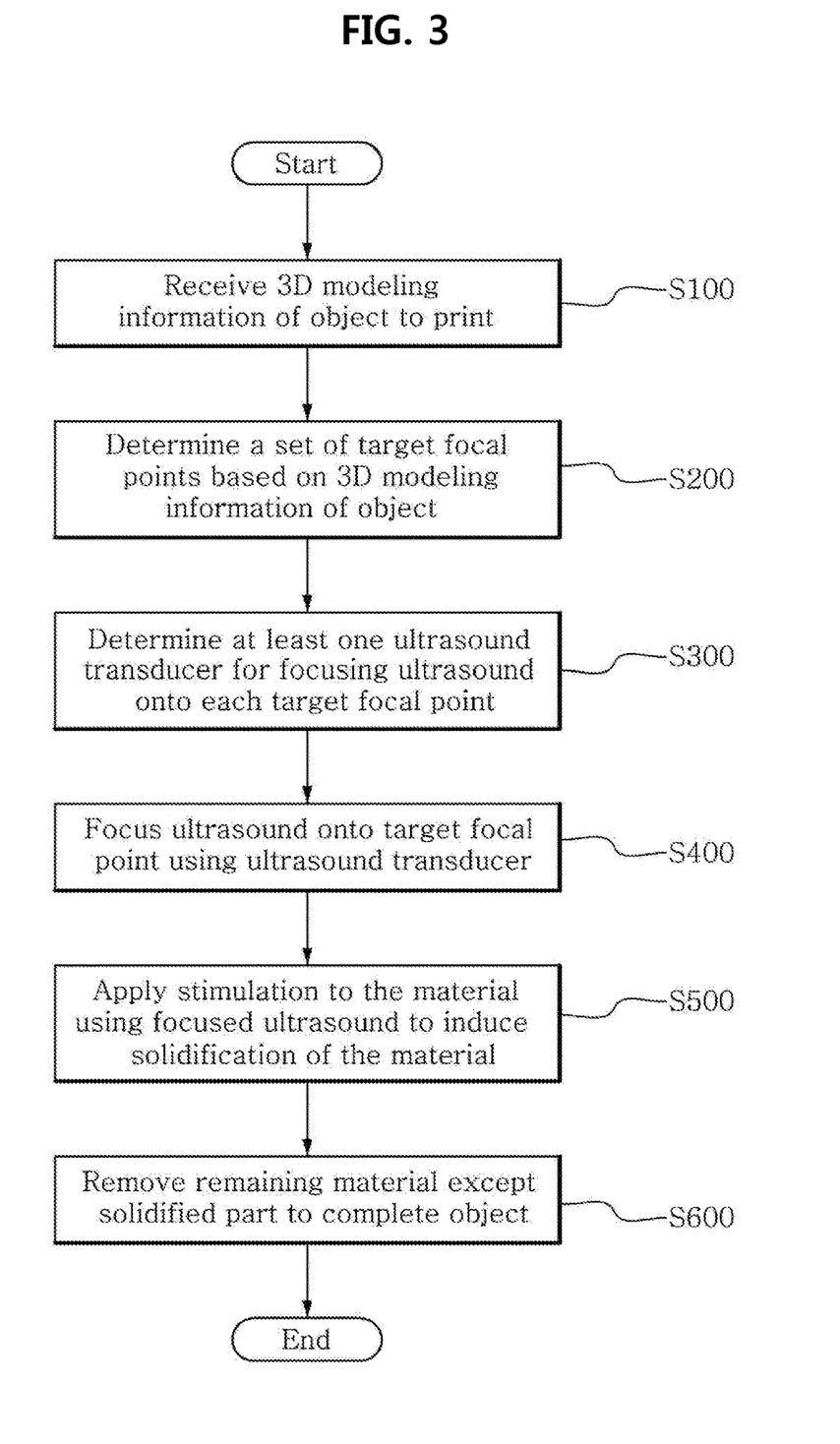
FIG. 3 is a flowchart showing a method for 3D printing using ultrasound according to an embodiment.

FIG. 3 is a flowchart showing an embodiment of a method for 3D printing using ultrasound. Hereinafter, each step will be described in detail with reference to FIG. 3.

First, 3D modeling information of an object to print is received (S100). As described above, the processor receives 3D modeling of a vehicle model (object) via a wired/wireless network. The 3D modeling information of the object may be stored in the internal storage of the 3D printer, or may be received from an external device or a server. The 3D modeling information includes 3D coordinate information necessary to produce the object in 3D.

Subsequently, a set of target focal points are determined based on the 3D modeling information of the object (S200). The set of target focal points $F_1$ to $F_N$ correspond to the 3D coordinate information, and include unique setting values required to practically produce the object, such as the number, locations, size and focusing order of the target focal points.

When the target focal points are determined, for each target focal point, an ultrasound transducer (a single ultrasound device or an array) to focus ultrasound is determined (S300). Referring to FIG. 2, for N target focal points $F_1$ to $F_N$, n ultrasound output devices $T_1$ to $T_n$ to focus ultrasound may be allocated. In an embodiment, one ultrasound output device (for example, a first ultrasound output device) may be set to focus ultrasound onto a plurality of target focal points (for example, first and second target focal points) in a sequential order, and on the contrary, a plurality of ultrasound output devices (for example, third and fourth ultrasound output devices) may be set to focus ultrasound onto one target focal point (for example, a third target focal point). The ultrasound transducer may be appropriately determined, taking into account various conditions including the positional relationship between the target focal point and the ultrasound transducer and the size of the focal point.

Subsequently, focusing ultrasound onto the target focal point (S400), and through this, applying stimulation to the material to induce solidification (S500) are simultaneously performed.

In an embodiment, the material used as the medium is a fluid that is solidified by stimulation of the threshold (temperature and/or pressure) or above, and the ultrasound transducer may apply stimulation of the threshold or above by focusing ultrasound onto the target focal point in the fluid.

Figure 4A:
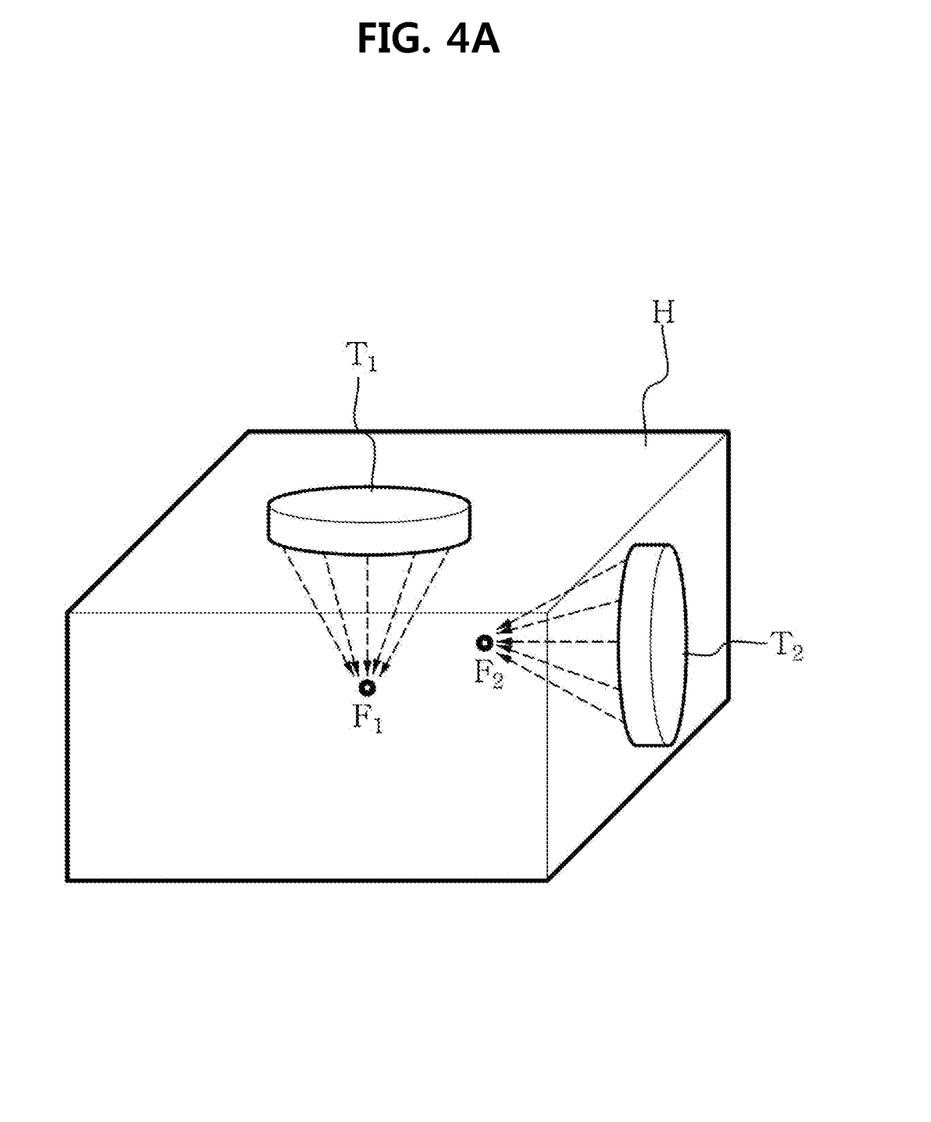
FIGS. 4A and 4B are diagrams showing a process of implementing 3D printing by inducing a change in state of material through ultrasound.
Figure 4B:
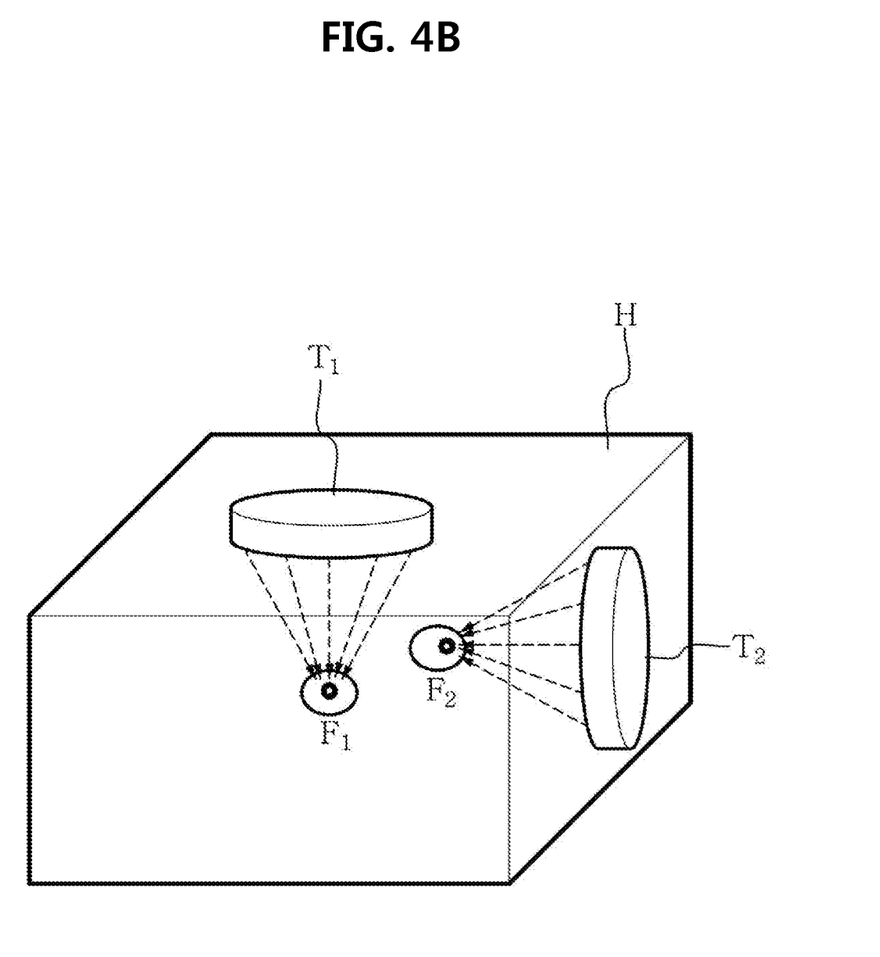

FIGS. 4A and 4B are diagrams showing a process of implementing 3D printing by inducing a change in state of material using ultrasound. FIGS. 4A and 4B are a simplified representation of part of the structure of the 3D printer to explain the principle of the present disclosure. As shown in FIG. 4A, the housing H is fully filled with a fluid (a fluid that is prone to be solidified by stimulation), and two ultrasound transducers $T_1$, $T_2$ are set to focus ultrasound onto each target focal point $F_1$, $F_2$.

Here, the fluid is in liquid state at room temperature but is prone to be solidified by a temperature rise or a mechanical vibration of the threshold (temperature or pressure) or above. The ultrasound outputted from the ultrasound transducers $T_1$, $T_2$ transfers energy while passing through the fluid and accordingly generates heat and vibration, but because stimulation is below the threshold, the fluid is not solidified.

However, at the target focal points $F_1$, $F_2$, a plurality of ultrasound beam lines generated by the transducer converges to one point, and thus energy transferred to the fluid is very great. Accordingly, as shown in FIG. 4B, the fluid may be solidified around the target focal points $F_1$, $F_2$. The size of the solidified area may vary depending on the setting values of ultrasound frequency, focused intensity and focused time, and the ultrasound focal volume. Additionally, energy necessary for solidification is different according to the type of fluid, and the controller may control the magnitude of energy focused onto the target focal point by adjusting the setting values of focused intensity and focused time of the ultrasound transducer.

Figure 5:
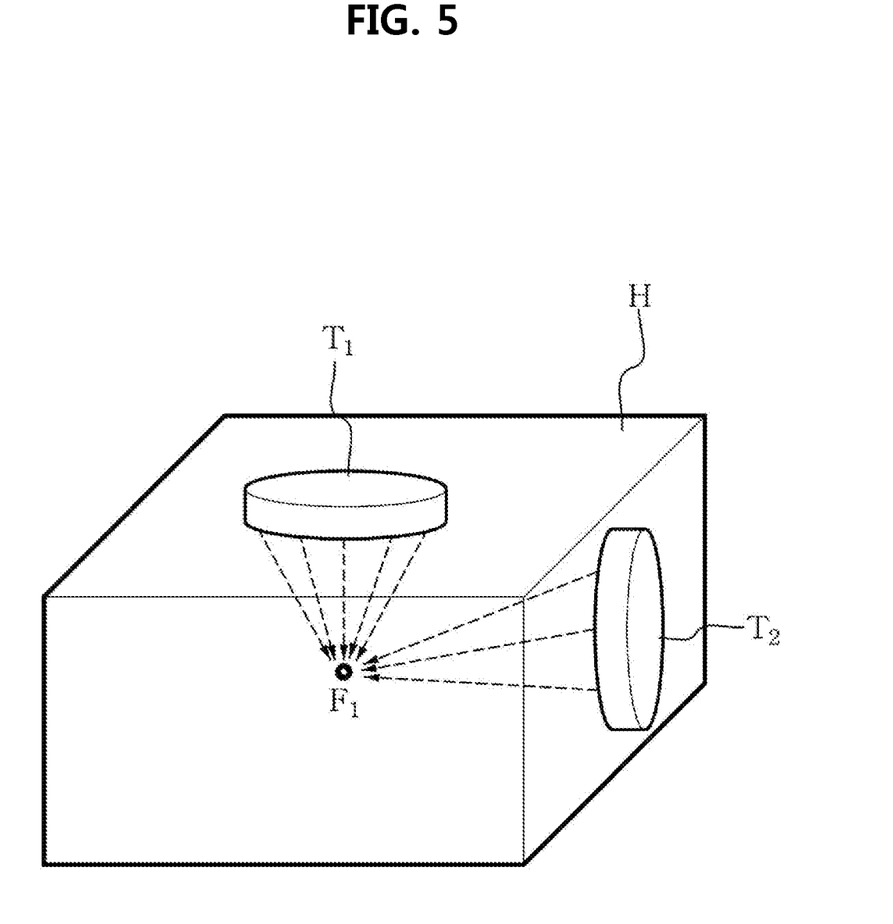
FIG. 5 is a diagram showing a plurality of ultrasound transducers allocated to one target focal point.

FIG. 5 is a diagram showing two ultrasound transducers $T_1$, $T_2$ allocated to one target focal point $F_1$. For example, a spot (i.e., one point, line or area that forms the contour of the object by solidification of the fluid) having a larger output area than other areas requires greater energy, and in this instance, a plurality of ultrasound transducers may be controlled to apply stimulation to one target focal point to reduce the time required to print.

In an embodiment, the controller may control the printing precision by adjusting the frequency of ultrasound outputted from the ultrasound transducer or the size of the target focal point. The deposition 3D printer can only control the precision by controlling the thickness of the nozzle that jets the medium, and once the output starts, it is inconvenient to replace the nozzle, which makes it difficult to control the precision. According to an embodiment of the present disclosure, it is possible to control the precision of the output by adjusting the ultrasound frequency or the size of the target focal point on system.

Finally, the remaining material except the solidified part is removed to complete the object (S600). When the fluid is discharged through an outlet of the housing H after S500, only the solidified object 100 remains. The 3D printer according to an embodiment may further include a heater or a coater to thermally treat or coat the surface of the object 100 in S600.

In another embodiment, the material may be a solid, not a fluid, which can be removed by stimulation of the threshold (temperature and/or pressure) or above. In this case, the ultrasound transducer is configured to remove a part of the solid by focusing ultrasound onto the target focal point in the solid. In case that the above-described method, i.e., a method of printing an object by solidifying a fluid material is relief printing, a method of representing a 3D object by removing a desired part of a solid material corresponds to intaglio printing. In an embodiment, the user may select the relief or intaglio printing method by controlling the focused intensity of the ultrasound transducer through the setting of the controller. High-intensity focused ultrasound may be used to destruct the solid material at the target focal point.

As described above, 3D printing may be implemented by sequentially or simultaneously focusing ultrasound onto the set of target focal points associated with the 3D coordinates of the object to induce a change in state of the material. In other words, the object may be produced by setting the target focal point based on the 3D modeling information of the object, and partially solidifying the material provided in the housing using the corresponding ultrasound transducer.

The above-described method for 3D printing may be implemented in the form of applications or program commands that can be executed through various computer components and may be recorded in computer-readable recording media. The computer-readable recording media may include program commands, data files and data structures, alone or in combination.

The program commands recorded in the computer-readable recording media may be specially designed and configured for the present disclosure, and may be those known and available to those having ordinary skill in the field of computer software.

Examples of the computer-readable recording media include hardware devices specially designed to store and execute program commands, for example, magnetic media such as hard disk, floppy disk and magnetic tape, optical media such as CD-ROM and DVD, magneto-optical media such as floptical disk, and ROM, RAM and flash memory. Examples of the program command include machine code generated by a compiler as well as high-level language code that can be executed by a computer using an interpreter. The hardware device may be configured to act as one or more software modules to perform the processing according to the present disclosure.

According to the embodiments described hereinabove, there is provided a new type of 3D printer for producing an object by focusing ultrasound onto material that changes in state by stimulation to solidify (or remove) it into a desired shape.

Accordingly, it is possible to simultaneously focus ultrasound onto the plurality of target focal points using the plurality of ultrasound transducers, thereby producing the object at a higher speed than a deposition 3D printer that deposits material upwards using a nozzle. In addition, for more precise representation, it was necessary to replace with a thinner nozzle, but according to an embodiment of the present disclosure, it is possible to control the precision by controlling the frequency of the outputted ultrasound or the size of the focal point.

While the present disclosure has been hereinabove described with reference to the embodiments, those skilled in the art will understand that various modifications and changes may be made thereto without departing from the spirit and scope of the present disclosure defined in the appended claims.

What is claimed is:

1. A 3D (3-dimensional) printer using ultrasound, comprising:
   a housing to provide material which changes in state by stimulation;
   at least one ultrasound transducer to output the ultrasound and focus the ultrasound onto a set of target focal points;
   a processor; and
   a controller to control the at least one ultrasound transducer,
   wherein the at least one ultrasound transducer applies the stimulation to the material using the ultrasound to induce a change in state of the material,
   wherein the at least one ultrasound transducer includes a plurality of single integrated ultrasound devices,
   each ultrasound device adjusts a current target focal point of the set of target focal points onto which the ultrasound is focused, by making a mechanical movement or receiving an electrical input, and
   the controller performs 3D printing by mechanically moving or electrically controlling each ultrasound device, and
   wherein the at least one ultrasound transducer includes a plurality of 1-dimensional array units,
   each array unit includes the plurality of single integrated ultrasound devices arranged in a series, and
   the controller performs 3D printing by mechanically moving each array unit.

2. The 3D printer using ultrasound according to claim 1, wherein in first movement, the controller adjusts the current target focal point by mechanically moving the at least one ultrasound transducer, and
   wherein in a second movement smaller than the first movement, the controller adjusts the current target focal point by electrically controlling the at least one ultrasound transducer.

3. The 3D printer using ultrasound according to claim 1, wherein each of the plurality of single integrated ultrasound devices includes an ultrasonic transducer using a piezoelectric material, CMUT, PMUT, an ultrasonic transducer using a photoacoustic effect, or an ultrasonic transducer using an electromagnetic force.

4. The 3D printer using ultrasound according to claim 1, wherein the processor receives 3D modeling information of an object to create,
   determines the set of target focal points based on the 3D modeling information of the object, and
   determines an ultrasound transducer for focusing the ultrasound onto each of the set of target focal points, and
   wherein the controller controls the determined ultrasound transducer to focus the ultrasound onto the set of target focal points.

5. The 3D printer using ultrasound according to claim 4, wherein the controller is further configured to control a frequency of the ultrasound outputted by the determined ultrasound transducer or a size of the current target focal point.

6. The 3D printer using ultrasound according to claim 1, wherein the material is a fluid which is solidified by the stimulation of a threshold or above, and
   wherein the at least one ultrasound transducer is further configured to focus the ultrasound onto the current target focal point in the fluid to induce the stimulation of the threshold or above.

7. The 3D printer using ultrasound according to claim 6, wherein the stimulation includes a temperature change, a mechanical vibration or presence of acoustic cavitation.

8. The 3D printer using ultrasound according to claim 1, wherein the material is a solid which is removable by the stimulation of a threshold or above, and wherein the at least one ultrasound transducer focuses the ultrasound onto the current target focal point in the solid to induce the stimulation of the threshold or above in order to remove a part of the solid.

9. The 3D printer using ultrasound according to claim 1, the material includes temperature-responsive or thermo-responsive polymers including poly(N-isopropylacrylamide), poly(N,N-diethylacrylamide), poly(methyl vinyl ether) and poly(N-vinylcaprolactam), or compounds or polymers used in sonocrystallization.

10. A 3D (3-dimensional) printer using ultrasound, comprising:

a housing to provide material which changes in state by stimulation;

an at least one ultrasound transducer to output the ultrasound and focus the ultrasound onto a set of target focal points;

a processor; and a controller to control the at least one ultrasound transducer, wherein the at least one ultrasound transducer applies the stimulation to the material using the ultrasound to induce a change in state of the material, wherein the ultrasound transducer includes a plurality of single integrated ultrasound devices, each ultrasound device adjusts a current target focal point of the set of target focal points onto which the ultrasound is focused, by making a mechanical movement or receiving an electrical input, and the controller performs 3D printing by mechanically moving or electrically controlling each ultrasound device, and wherein the at least one ultrasound transducer includes a plurality of 2-dimensional array units, each array unit includes the plurality of single integrated ultrasound devices arranged in rows and columns, and the controller performs 3D printing by electrically controlling each array unit.

11. The 3D printer using ultrasound according to claim 10, wherein in a first movement, the controller adjusts the current target focal point by mechanically moving the at least one ultrasound transducer, and wherein in a second movement smaller than the first movement, the controller adjusts the target focal point by electrically controlling the at least one ultrasound transducer.

12. The 3D printer using ultrasound according to claim 10, wherein each of the plurality of single integrated ultrasound devices includes an ultrasonic transducer using a piezoelectric material, CMUT, PMUT, an ultrasonic transducer using a photoacoustic effect, or an ultrasonic transducer using an electromagnetic force.

13. The 3D printer using ultrasound according to claim 10, wherein the processor receives 3D modeling information of an object to create, determines the set of target focal points based on the 3D modeling information of the object, and determines an ultrasound transducer for focusing the ultrasound onto each of the set of target focal points, and wherein the controller controls the determined ultrasound transducer to focus the ultrasound onto the set of target focal points.

14. The 3D printer using ultrasound according to claim 3, wherein the controller is further configured to control a frequency of the ultrasound outputted by the determined ultrasound transducer or a size of the current target focal point.

15. The 3D printer using ultrasound according to claim 10, wherein the material is a fluid which is solidified by the stimulation of a threshold or above, and wherein the at least one ultrasound transducer is further configured to focus the ultrasound onto the current target focal point in the fluid to induce the stimulation of the threshold or above.

16. The 3D printer using ultrasound according to claim 15, wherein the stimulation includes a temperature change, a mechanical vibration or presence of acoustic cavitation.

17. The 3D printer using ultrasound according to claim 10, wherein the material is a solid which is removable by the stimulation of a threshold or above, and wherein the at least one ultrasound transducer focuses the ultrasound onto the current target focal point in the solid to induce the stimulation of the threshold or above in order to remove a part of the solid.

18. The 3D printer using ultrasound according to claim 10, the material includes temperature-responsive or thermo-responsive polymers including poly(N-isopropylacrylamide), poly(N,N-diethylacrylamide), poly(methyl vinyl ether) and poly(N-vinylcaprolactam), or compounds or polymers used in sonocrystallization.

* * * * *